United States Patent
Serebrin

(10) Patent No.: US 9,959,224 B1
(45) Date of Patent: May 1, 2018

(54) DEVICE GENERATED INTERRUPTS COMPATIBLE WITH LIMITED INTERRUPT VIRTUALIZATION HARDWARE

(71) Applicant: Google LLC, Mountain View, CA (US)

(72) Inventor: Benjamin Charles Serebrin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 928 days.

(21) Appl. No.: 14/139,095

(22) Filed: Dec. 23, 2013

(51) Int. Cl.
  *G06F 13/24* (2006.01)
  *G06F 9/455* (2018.01)
  *G06F 9/48* (2006.01)

(52) U.S. Cl.
  CPC .......... *G06F 13/24* (2013.01); *G06F 9/45533* (2013.01); *G06F 9/45558* (2013.01); *G06F 9/4812* (2013.01); *G06F 2009/45579* (2013.01); *G06F 2213/0026* (2013.01)

(58) Field of Classification Search
  CPC .... G06F 13/24; G06F 9/4812; G06F 9/45558; G06F 9/45533; G06F 2009/45579; G06F 2213/0026
  See application file for complete search history.

(56) References Cited

U.S. PATENT DOCUMENTS

| 8,055,827 | B2  | 11/2011 | Serebrin et al. | |
| 8,180,944 | B2  | 5/2012  | Serebrin et al. | |
| 8,738,860 | B1* | 5/2014  | Griffin | G06F 12/0897 |
|           |     |         |         | 711/122 |
| 9,047,208 | B1* | 6/2015  | Moore | G06F 9/45533 |
| 2001/0018721 | A1* | 8/2001 | McKenna | G06F 13/409 |
|           |     |         |         | 710/305 |
| 2007/0094652 | A1* | 4/2007 | Chia | G06F 8/452 |
|           |     |         |         | 717/151 |
| 2010/0250792 | A1* | 9/2010 | Harriman | G06F 12/02 |
|           |     |         |         | 710/22 |
| 2010/0262741 | A1* | 10/2010 | Hayakawa | G06F 13/24 |
|           |     |         |         | 710/263 |

(Continued)

OTHER PUBLICATIONS

"Chapter 29: Apic Virtualization and Virtual Interrupts", vol. 3C, pp. 1-14, Aug. 9, 2013.

(Continued)

*Primary Examiner* — Steven Snyder
*Assistant Examiner* — John Roche
(74) *Attorney, Agent, or Firm* — Lerner, David, Littenberg, Krumholz & Mentlik, LLP

(57) ABSTRACT

A system and method are provided for generating interrupts in a computer system using limited interrupt virtualization hardware. A peripheral component interconnect express (PCIe) device atomically sets one or more bits in a posted interrupt vector (PIV) of a target central processing unit (CPU), and sends an interrupt to the target CPU, the interrupt notifying the target CPU of changes to the PIV. Atomically setting the one or more bits may include executing a compare-and-swap function, executing a fetch-and-add instruction to increment a DWORD corresponding to the one or more bits in the PIV by a value of 2 ˆ (b mod 32), using PCIe byte enables to write to a single byte in the PCIe address space that contains the one or more bits, using a helper CPU, performing a PCIe swap to the PIV, or storing the PIV in a memory of the PCIe device.

20 Claims, 8 Drawing Sheets

(56) References Cited

U.S. PATENT DOCUMENTS

| | | | |
|---|---|---|---|
| 2010/0329254 A1* | 12/2010 | Chen | H04L 49/00 370/390 |
| 2011/0161541 A1 | 6/2011 | Madukkarumukumana et al. | |
| 2011/0296222 A1* | 12/2011 | Tan | G06F 1/3203 713/324 |
| 2013/0007768 A1* | 1/2013 | Saripalli | G06F 9/52 719/317 |

OTHER PUBLICATIONS

Rödel, "Next-generation Interrupt Virtualization for KVM", Aug. 2012.

* cited by examiner

DEVICE GENERATED INTERRUPTS COMPATIBLE WITH LIMITED INTERRUPT VIRTUALIZATION HARDWARE

BACKGROUND

Some interrupt virtualization hardware provides support for avoiding some but not all guest intercepts during the lifetime of an interrupt. In particular, peripheral component interconnect express (PCIe) or other devices that send standard message signaled interrupt (MSI) or MSI-X interrupts involve a trip through a hypervisor before they can be delivered to a guest virtual central processing unit (VCPU). Handling interrupts in the hypervisor requires either dedicating a hypervisor core for handling interrupts or tolerating intercepts on some VCPU when the interrupt arrives.

SUMMARY

The present disclosure provides a system and method for interrupt virtualization systems to deliver device-sourced interrupts directly to a running VCPU. For example, a PCIe device may use interrupts compatible with limited interrupt virtualization hardware to atomically set a bit in a posted interrupt (PIV) of a target CPU, and to send a notification to the target CPU.

One aspect of the disclosure provides a method for generating interrupts in a computer system using limited interrupt virtualization hardware. The method comprises atomically setting, using a peripheral component interconnect express (PCIe) device, one or more bits in a posted interrupt vector (PIV) of a target central processing unit (CPU). Atomically setting the one or more bits comprises at least one of executing a compare-and-swap function, executing a fetch-and-add instruction to increment a DWORD corresponding to the one or more bits in the PIV by a value of $2 \wedge (b \bmod 32)$, using PCIe byte enables to write to a single byte in the PCIe address space that contains the one or more bits, using a helper CPU, performing a PCIe swap to the PIV, and storing the PIV in a memory of the PCIe device. The method further includes sending, by the PCIe device, an interrupt to the target CPU, the interrupt notifying the target CPU of changes to the PIV.

Another aspect of the disclosure provides a PCIe device for generating interrupts in a computer system using limited interrupt virtualization hardware. The device includes a memory storing instructions and a processor in communication with the memory. The processor executes the instructions to atomically set one or more bits in a posted interrupt vector (PIV) of a target central processing unit (CPU). Atomically setting the one or more bits comprises at least one of executing a compare-and-swap function, executing a fetch-and-add instruction to increment a DWORD corresponding to the one or more bits in the PIV by a value of $2 \wedge (b \bmod 32)$, using PCIe byte enables to write to a single byte in the PCIe address space that contains the one or more bits, using a helper CPU, performing a PCIe swap to the PIV, and storing the PIV in a memory of the PCIe device. The processor further sends an interrupt to the target CPU, the interrupt notifying the target CPU of changes to the PIV.

Yet another aspect of the disclosure provides a non-transitory computer readable medium storing instructions executable by a processor to perform a method generating interrupts in a computer system using limited interrupt virtualization hardware. The method includes atomically setting one or more bits in a posted interrupt vector (PIV) of a target central processing unit (CPU). Atomically setting the one or more bits comprises at least one of executing a compare-and-swap function, executing a fetch-and-add instruction to increment a DWORD corresponding to the one or more bits in the PIV by a value of $2 \wedge (b \bmod 32)$, using PCIe byte enables to write to a single byte in the PCIe address space that contains the one or more bits, using a helper CPU, performing a PCIe swap to the PIV, and storing the PIV in a memory of the PCIe device. The method further includes sending an interrupt to the target CPU, the interrupt notifying the target CPU of changes to the PIV.

A further aspect of the disclosure provides a system, comprising a PCIe device, at least one CPU core, the at least one CPU core including a target CPU core, and a VT-d in communication with the PCIe device and the at least one CPU core, the VT-d enabling communication between the PCIe device and the at least one CPU core. The PCIe device is programmed to atomically set one or more bits in a posted interrupt vector (PIV) of the target CPU, and send an interrupt to the target CPU, the interrupt notifying the target CPU of changes to the PIV.

DETAILED DESCRIPTION

Figure 1:
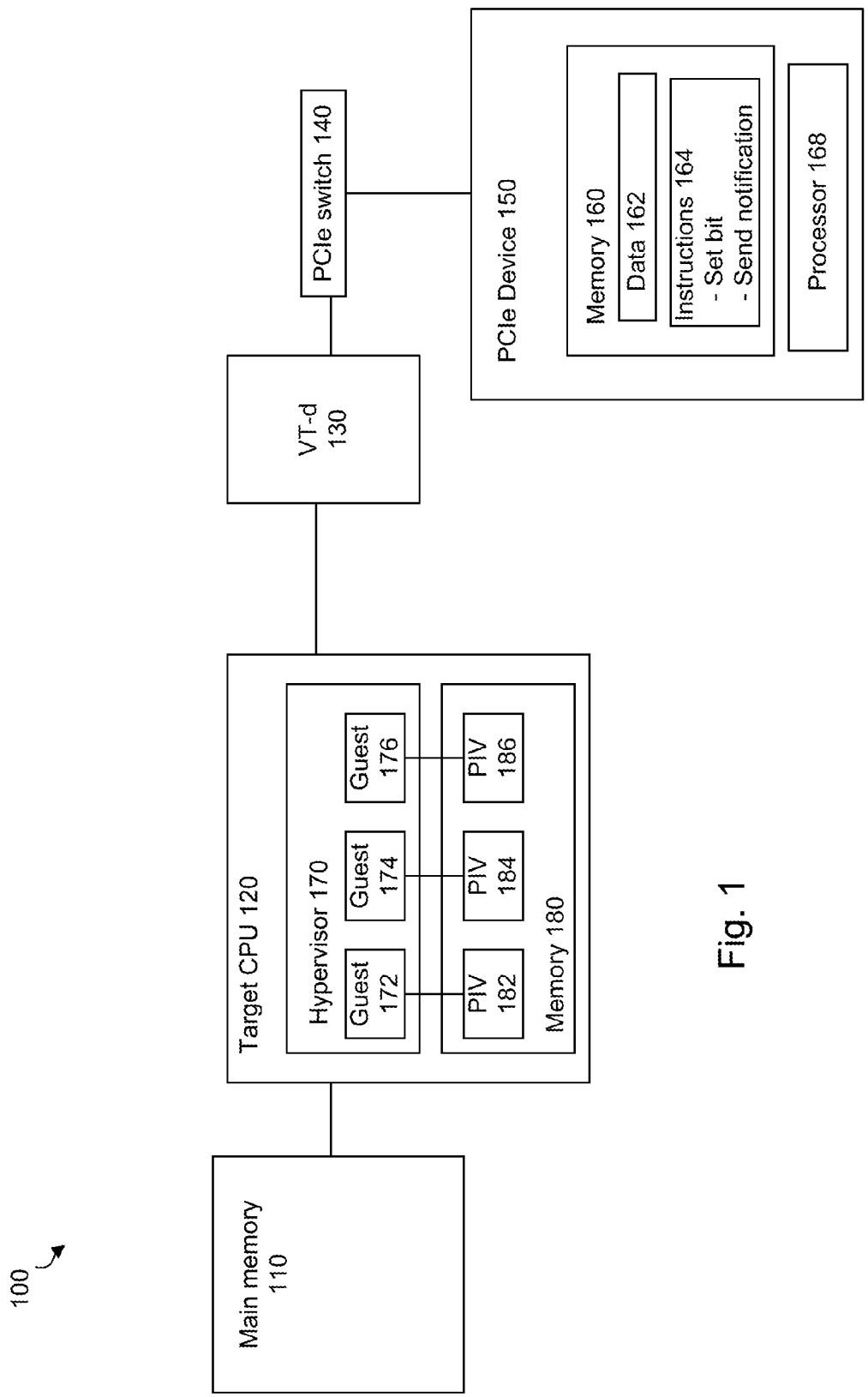
FIG. 1 is a schematic diagram of an example computer system according to aspects of the disclosure.

The posted interrupt vector (PIV) is an in-CPU-memory 256-bit bit vector that contains one bit for each pending interrupt the guest should consume. The PIV is intended as a temporary staging area for a hypervisor running on some other core Z to send an interrupt to a VCPU running on core A. The hypervisor sets bit V (via an atomic logical OR) in the bit vector and sends a preselected hardware notification interrupt to core A. Microcode on core A reads and zeroes all 256 bits of the PIV, copies any set bits in the PIV into a per-VCPU pending interrupt structure, and later delivers those interrupts.

PCIe devices can send interrupts to a particular core C and a particular vector V, where C and V are encoded in the address and data of the PCIe write. Interrupt remapping in a Virtualization Technology for Directed I/O (VT-d) can transform the interrupt to some other core C' and some other vector V'.

PCIe atomics support 32- and 64-bit FetchAndAdd, CompareAndSwap, and unconditional Swap. No PCIe byte enables are allowed, and the address must be naturally aligned, for example, 32-bit or 64-bit, depending on size. AtomicOR is not supported by PCIe devices, so setting the PIV bit properly is challenging.

This disclosure is directed to a PCIe device and method for writing PIV bits to a target core C and sending notification interrupts. In particular, the device and method set a bit atomically in the PIV of the target core C, and send a corresponding interrupt to notify the core C that the PIV changed. Because atomic logical OR commands, which are used by hypervisors in setting an appropriate bit in a bit vector, are not available to PCIe devices, the disclosure provides several examples of how to atomically set a bit "b" in the PIV. The PCIe device can then send the interrupt to the target core C and a particular vector "V", where C and V are encoded in the address and data of the PCIe write. The PCIe device described above may be, for example, a customized network interface controller (NIC), a solid state drive (SSD), a field programmable gate array (FPGA), an application specific integrated circuit (ASIC), a graphics processing unit (GPU), etc.

According to a first example, the PCIe device may use a 32-bit compare-and-swap to set the bit "b" in the PIV. The PIV may be compared to a value of 0, and if the 32-bit range of the PIV is equal to zero, the bit b may be written to the PIV. This example implementation may work particularly well for a running guest virtual central processing unit (VCPU), for which a latency to drain the PIV is two PCIe writes (e.g., PIV access and interrupt).

According to a second example, the device may use a fetch-and-add instruction. For example, to set bit b in the PIV, the PCIe device may perform a fetch-and-add to increment the (b/32)th DWORD in the PIV vector V for VCPU C by a value of 2 ^ (b mod 32). In this example, the hypervisor software may guarantee that no other device is told to use vector V on the VCPU. Moreover, the PCIe device may ensure that it will not resend the interrupt until the PIV bit b is cleared. For example, the PCIe device may be configured with an automasking behavior, such that only guest code can re-enable interrupts. As another example, the PCIe device may have an implicit automasking behavior, such as a NIC which can suppress further interrupts until the next time a guest VPCU writes a corresponding register. The PCIe device may use the returned fetch value to determine whether accidental overflow occurred in the PIV.

According to a third example, the device may use PCIe byte enables to write to a single byte in the PIV that contains the bit b for vector V. In this regard, any bits in neighboring bytes will not be modified. The PCIe device may then send the notification interrupt. A guest operating system is instructed not to assign any interrupts to a same aligned 8-vector range as the device is using. For example, if the device uses interrupt 0x81, then vectors 0x80 and 0x82-0x87 will not be used. Alternatively, the guest OS can be allowed to use neighboring vectors as long as the hypervisor never uses the neighboring PIV bits to deliver those vectors. If a hypervisor must send a remote interrupt in the range of neighboring PIV bits, it will interrupt the hypervisor on the PCIe device to do the delivery.

According to another example, a "helper" CPU core from a host operating system may participate in writing to the PIV by performing accelerator tasks. For example, the helper CPU may aggregate all passthrough interrupts and send atomic bit writes and interrupt notifications. Moreover, the helper CPU may poll memory of the target core C, and a MSI address of the PCIe device may be aimed at the polled memory. This example may be advantageous in that few or no hardware changes may be required.

According to yet another example, the device may perform a PCIe swap to the PIV, writing a 32-bit bitvector setting only vector V, and following the write with a notification. If the returned swap value is 0, then the PIV write may be considered successful. If the returned swap value is not 0, the PCIe device has stolen a set of pending interrupts. Accordingly, the PCIe device may signal the hypervisor on the target core C with a predefined interrupt vector, and push the bit vector containing the stolen interrupts on a queue for the hypervisor to deliver manually.

According to a further example, the PCIe device stores the PIV in a memory of the PCIe device. The PCIe device may then enforce atomic behavior for accessing the core C.

FIG. 1 illustrates an example computing system 100. The computing system 100 may be, for example, a system of computing devices interconnected on a motherboard. Such a network may be present in datacenters or other computing environments. The computer system 100 includes main memory 110 coupled to one or more central processing units (CPU) 120. The CPUs 120 are further coupled to an input/output memory management unit (IOMMU), such as Virtualization Technology for Directed I/O (VT-d) device 130. The VT-D 130 and PCIe device 150 are connected via a peripheral interconnect card express (PCIe) switch 140.

The main memory 110 is accessible by the CPU 120, and may store data and instructions executable by the CPU 120. The main memory 110 may be any type of memory, such as read only memory, random access memory, removable storage media, cache, registers, or the like.

The CPU core 120 is connected to and communicates with the main memory 110 by, for example, a data bus and an address bus. The CPU core 120 may be a microprocessor residing on a chip, a multi-core processor, or any other known processor. While only one CPU core is shown, any number of CPU cores may be connected between the main memory 110 and the VT-d 130. The CPU 120 includes hypervisor 170, which controls one or more guests 172, 174, 176. The guests 172-176 may be virtual machines or other processes. The CPU 120 further includes memory 180, which includes one or more posted interrupt vectors (PIVs) 182, 184, 186. Each of the PIVs 182-186 may correspond to one of the guests 172-176.

The VT-d 130 may be an IOMMU and connects DMA-capable devices to the main memory 110. The PCIe switch 140 is a high speed interconnect providing for interconnection of one or more system devices, such as the PCIe device 150, to other components in the computer system 100. The PCIe switch 140 may be a motherboard-level interconnect, an expansion card interface, or the like. The system devices may communicate through the PCIe switch 140 over one or more links.

The PCIe device 150 includes memory 160, which includes data 162 and instructions 164. The instructions 164 are executable by processor 168 to atomically set a bit in one of the PIVs 182-186 of the CPU 120, and to send an interrupt to the CPU 120 notifying it of the change. The memory 160 and processor 168 are described in further detail below in connection with FIG. 7. The PCIe device may be any of a variety of system devices, including system devices that have been customized. For example, the PCIe device 150 may be a customized NIC, SSD, FPGA, ASIC, GPU, or the like.

While the computer system 100 has been described above as a system of devices on a motherboard, it should be understood that the computer system 100 may be any configuration of electronically coupled computing devices. For example, the network may include a backplane interconnecting peripherals, an expansion card interface, or the like. As another example, the connection between the computing devices may be hard-wired connections, wireless connections, or any other type of connections. As yet another example, the computer system 100 may include TCP/IP, 802.33, Ethernet, InfiniBand, or any other type of network.

The PCIe device may use any of a variety of techniques to atomically set the bit in one of the PIVs 172-176. A number of examples for atomically setting a bit "b" of a vector "V" in a given PIV are described below.

Figure 2:
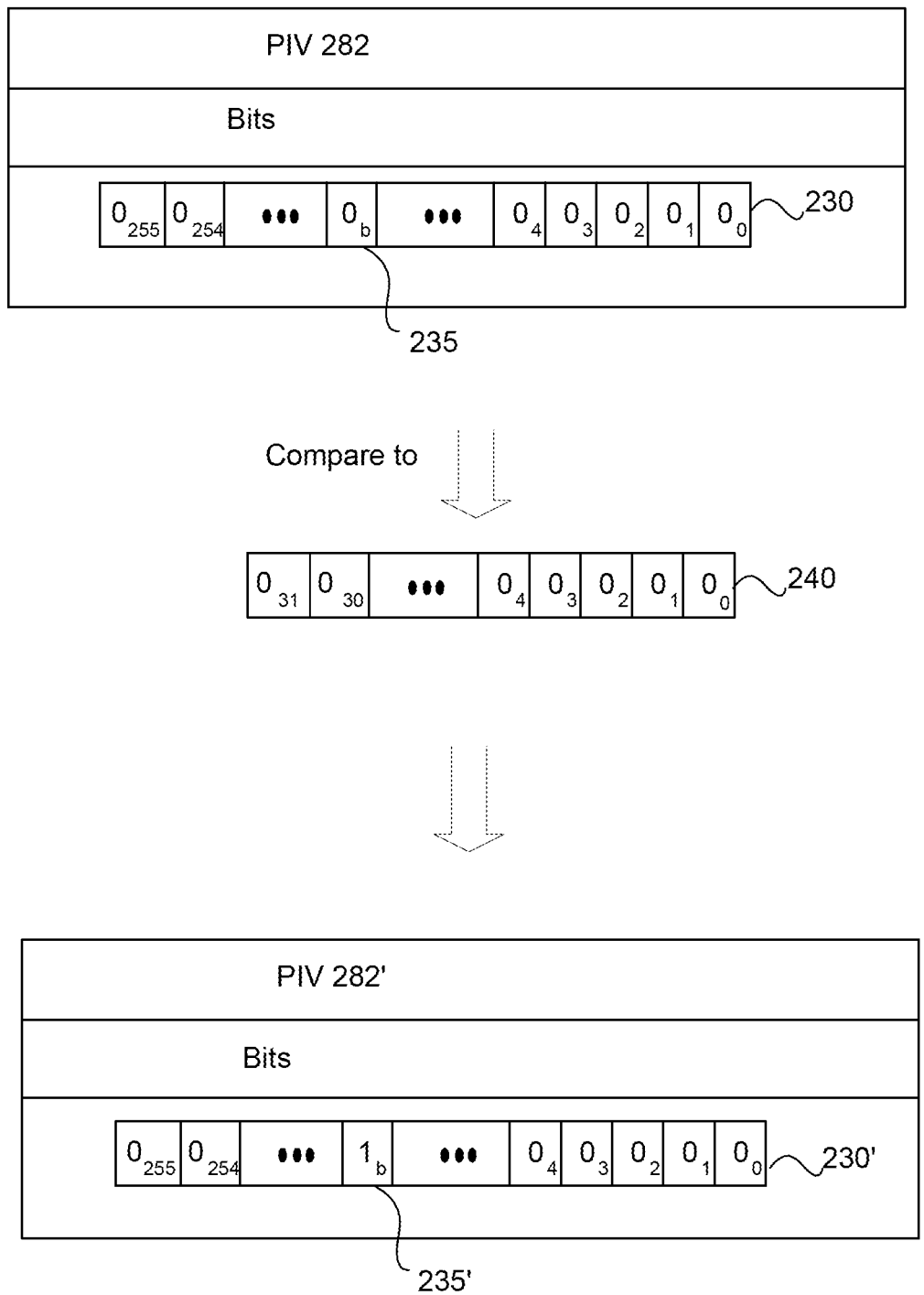
FIG. 2 illustrates an example of atomically writing to a bit in a PIV according to aspects of the disclosure.

FIG. 2 illustrates a first example of atomically setting a bit in the PIV. In this example, the PCIe device 150 uses a compare-and-swap function. For example, the PCIe device 150 may perform a 32-bit compare-and-swap to set bit "b" in a PIV 282. As shown, the PIV 282 includes a number of bits 230, including bit "b" 235. The bits 230 may be stored as one or more words or as a single bit-vector. While 256 bits are shown, the PIV 282 may include any number of bits. The bits 230 in PIV 282 may be compared to value of 0, for example, as shown in comparison bit array 240. If the PIV 282 is full of zeros, the bit "b" may be written to the PIV. For example, as shown in the PIV 282', bit 235' of bit array 230' has been written to. The bit 235 may be written to by the PCIe device 150 of FIG. 1, or by another system device, such as a NIC. While the example above uses a 32-bit compare and swap, comparison bit arrays of any size may be used. This example may work particularly well for a running guest VCPU, for which latency to drain the PIV 282 is two writes, such as one write for PIV access and one write for interrupt.

Figure 3:
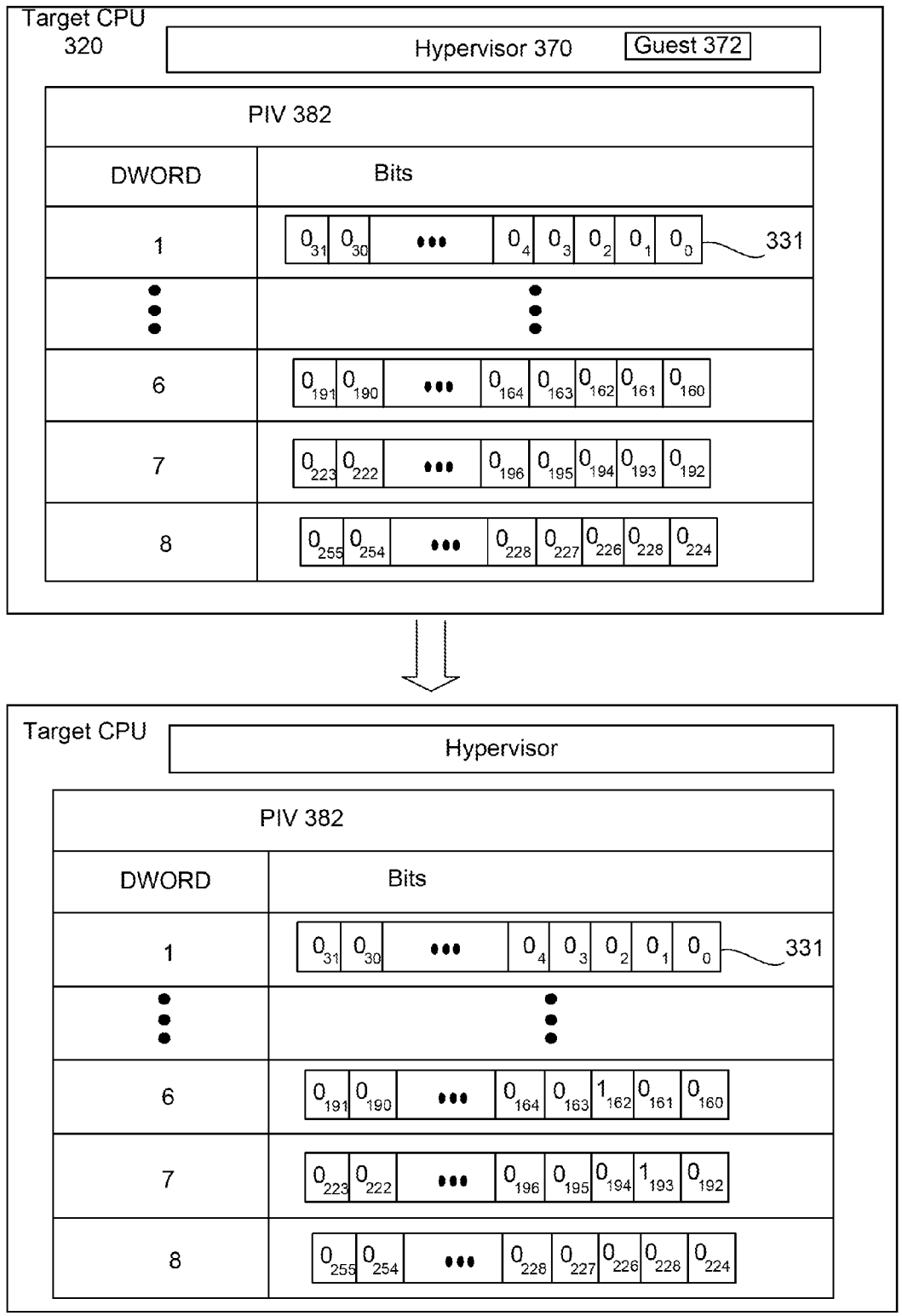
FIG. 3 illustrates another example of atomically writing to a bit in a PIV according to aspects of the disclosure.

FIG. 3 illustrates a second example of atomically setting a bit in the PIV. In this example, the PCIe device 150 (FIG. 1) uses a fetch-and-add instruction. For example, target CPU 320 includes hypervisor 370 running guest VCPU 372. The CPU 320 further includes PIV 382 with a number of DWORDS, each DWORD representing a portion of the vector. For example a first DWORD corresponds to a first bit array 331 including bits 0-31, a second DWORD corresponds to a second bit array (not shown) including bits 32-63, and so on. In this example, the bit "b" that will be atomically set is bit 193. The PCIe device may set the bit b=193 by performing a fetch-and-add to increment the b/32$^{nd}$ DWORD by a value of 2 ^ (b mod 32). For example, 193 mod 32=3. 2^3=8. Atomically adding 8 sets bit 3 of DWORD (193/32=6). The hypervisor 370 guarantees that no other entity will set interrupt vector 193. Moreover, the PCIe device may wait until the bit "b" is cleared prior to sending further interrupts. For example, the PCIe device may be configured with an automasking behavior, such that only guest code can re-enable interrupts. As another example, the PCIe device may have an implicit automasking behavior, such as a NIC which can suppress further interrupts until the next time a guest VCPU writes a corresponding register. According to some examples, the PCIe device may use the returned fetch value to determine whether accidental overflow occurred in the PIV. If the PCIe device detects accidental overflow, it will signal the hypervisor 370.

Figure 4:
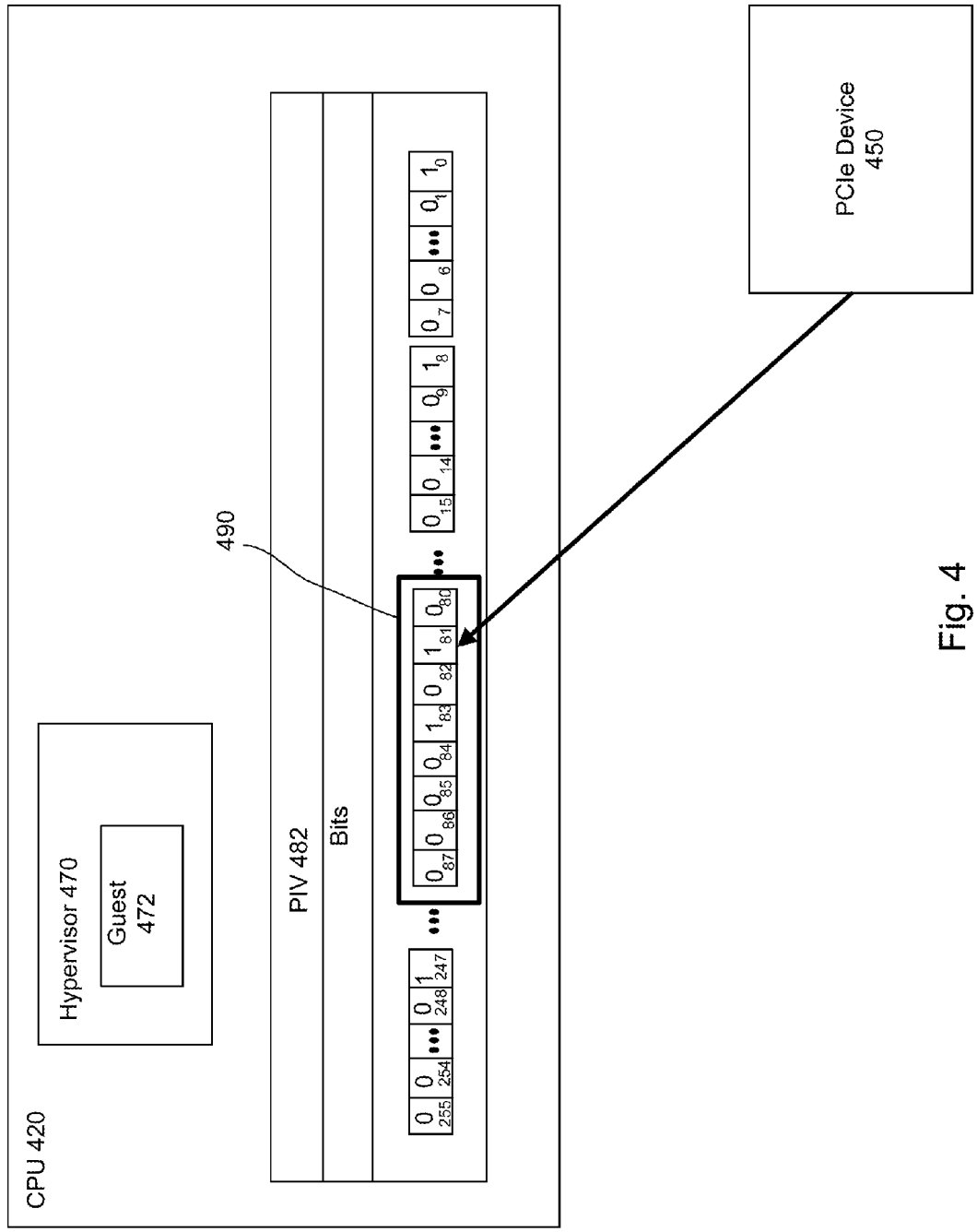
FIG. 4 illustrates another example of atomically writing to a bit in a PIV according to aspects of the disclosure.

FIG. 4 illustrates a third example for atomically setting bit "b" in a PIV. In this example, PCIe device 450 uses byte-enables to write to a single byte in the PIV that contains the bit "b." As shown, CPU 420 includes hypervisor 470 running guest 472, and PIV 482. PIV 482 includes a number of bytes, such as byte 490. PCIe device 450 uses byte enables to write to a single byte 490 that contains the bit "b", without modifying neighboring bytes. The PCIe device then sends a notification interrupt to the CPU 420 notifying it of the change. According to one example, the guest 472 is instructed not to assign any interrupts to a same aligned 8-vector range as the PCIe device 450 is using. For example, because PCIe device 450 is using vector at address 0x81, the guest 472 is instructed not to use the vectors at 0x80, and 0x82-0x87. According to another example, the guest 472 is permitted to use neighboring vectors as long as the hypervisor 470 never uses the neighboring PIV bits to deliver those vectors. If in this example the hypervisor 470 must send a remote interrupt in the range of neighboring PIV bits, it may interrupt a hypervisor running the target VCPU to do the delivery, or request that the PCIe device 450 perform the delivery.

Figure 5:
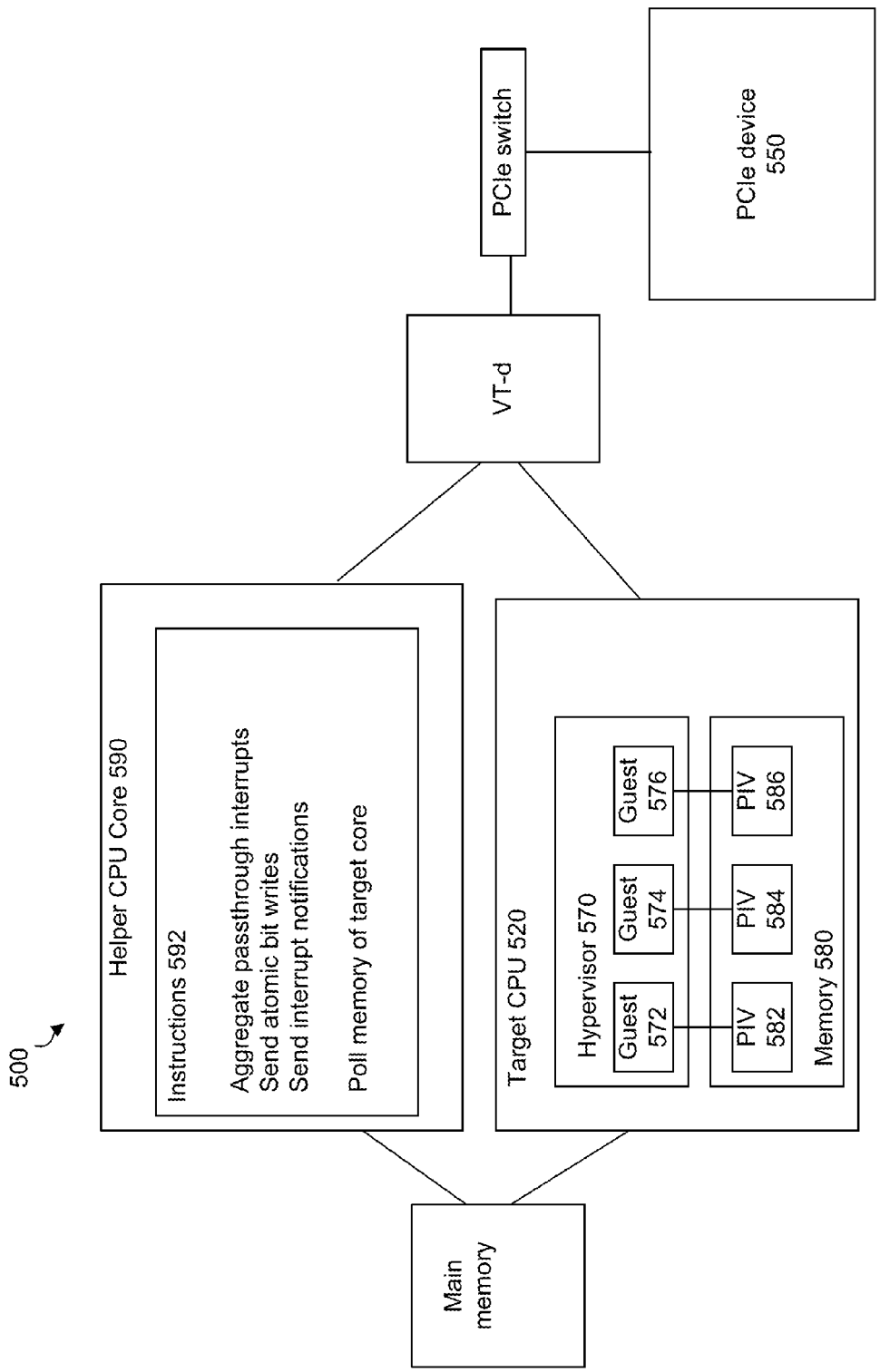
FIG. 5 illustrates another example of atomically writing to a bit in a PIV according to aspects of the disclosure.

FIG. 5 illustrates yet another example for atomically writing a bit "b" in a PIV. Computer system 500 includes components similar to those described above in connection with FIG. 1 and target CPU 520, hypervisor 570, guests 572-576, memory 580, and PIVs 582-586. According to this example, a "helper" CPU core 590 may participate in writing to PIV 572 on target CPU core 520, for example, by performing accelerator tasks. The helper CPU 590 may be another core on a same host operating system as the target core 520, and may reside on a same device or chip as the target core 520 or on a separate device or chip. The helper CPU core 590 may be programmed to execute instructions, such as instructions for performing the accelerator tasks. The instructions may be stored in memory on a same device as the helper CPU core 590 or on another device in communication with the helper CPU core 590. The instructions 592 may provide for, for example, aggregating passthrough interrupts, sending atomic bit writes, and sending interrupt notifications. According to one example, the helper CPU core 590 may poll memory of the target CPU 570, and a MSI address of the PCIe device 550 may be aimed at the memory polled by the helper CPU 590, rather than the usual special interrupt range. In this regard, entry into the helper CPU core's interrupt handler can be avoided. One advantage of the example of FIG. 5 is that few or no hardware changes are required.

Figure 6:
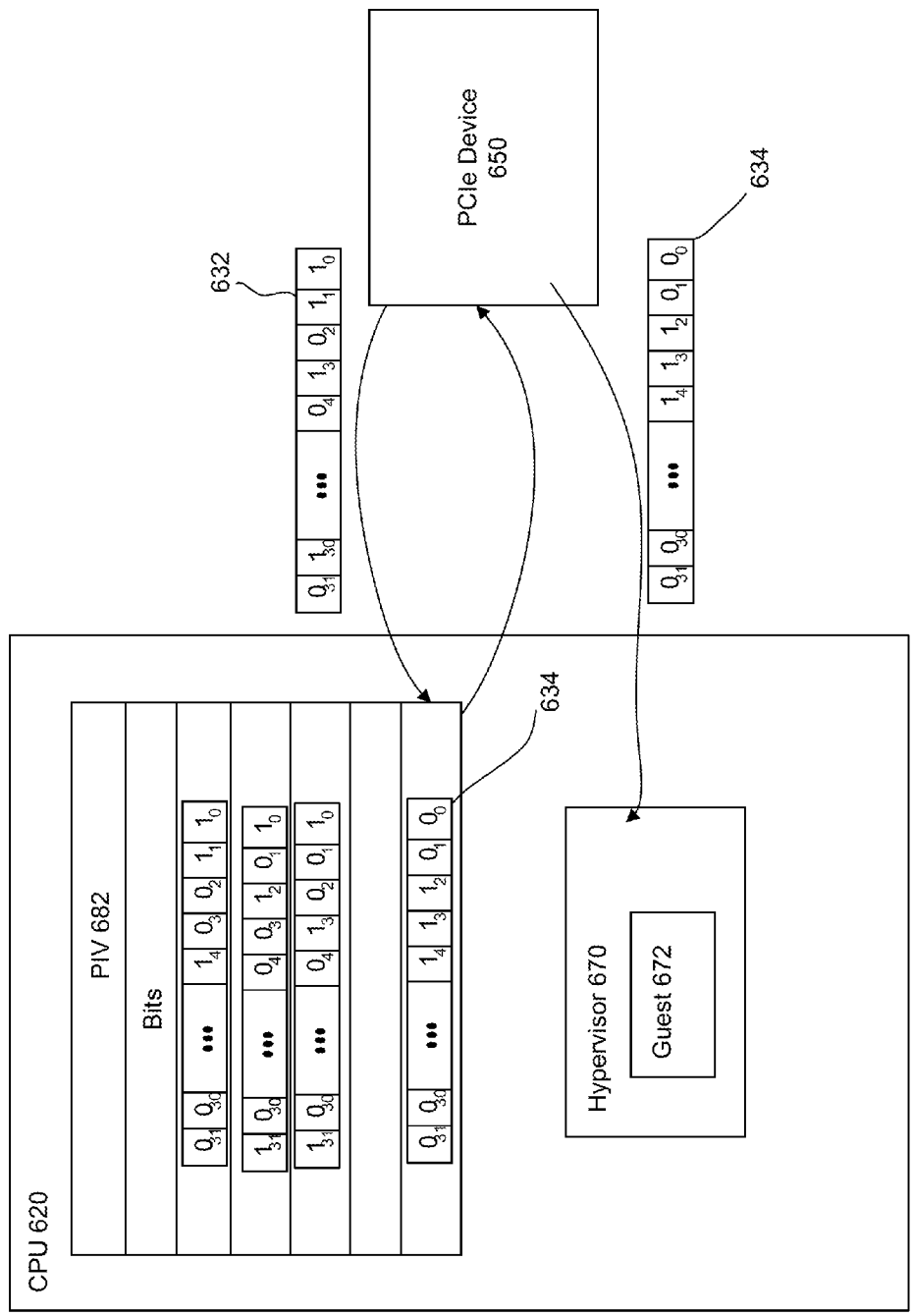
FIG. 6 illustrates another example of atomically writing to a bit in a PIV according to aspects of the disclosure.

FIG. 6 illustrates another example for atomically setting the bit "b" in a PIV. In this example, PCIe device 650 performs a swap to PIV 682 of target CPU 620. During the swap, the PCIe device 650 may write a bitvector, such as 32-bit bitvector 632, setting only vector 634. If the returned swap value is zero, for example, if the vector 634 includes all zeros, the write to the PIV 682 may be considered successful. However, in some instances the returned swap value may not be zero. For example, as shown in FIG. 6, the vector 634 is a non-zero vector, and therefore the returned swap value is not zero. As such, the PCIe device 650 has effectively stolen a set of pending interrupts. Accordingly, the PCIe device 650 may signal hypervisor 670 with a predefined interrupt vector. The PCIe device 650 may provide the hypervisor 670 with the stolen bitvector 634, for example in the predefined interrupt or as a separate communication. The PCIe device 650 may push the bit vector 634 containing the stolen interrupts on a queue for the hypervisor to deliver manually to the PIV 682.

Figure 7:
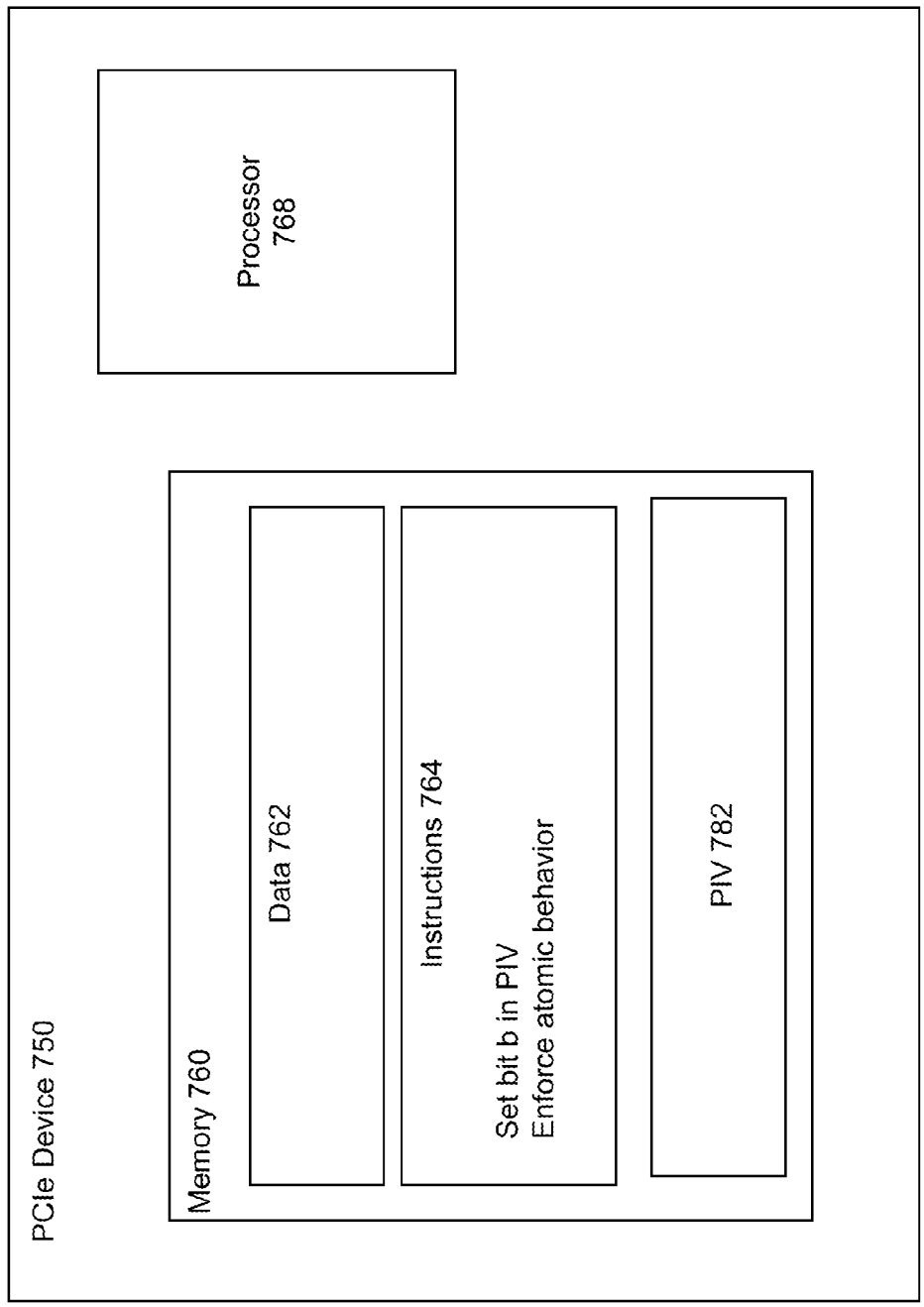
FIG. 7 is a block diagram of an example PCIe device and illustrates another example of atomically writing to a bit in a PIV according to aspects of the disclosure.

FIG. 7 illustrates yet a further example for atomically setting bit "b" in a PIV. According to this example, PCIe device 750 stores PIV 782 in a memory 760 of the PCIe device 750. The PCIe device 750 may set bits in the PIV 782, and enforce atomic behavior for accessing the target CPU core. For example, the PCIe device 750 may contain a memory-mapped IO register for each PIV stored in the device. The hypervisor or MSI-x interrupt source is configured to write the value V to this register, if the hypervisor or MSI-x source wishes to send an interrupt with vector V. The PCIe device then sets bit V in the corresponding PIV. Reads and swaps-with-zero to the PIV are performed by the interrupt virtualization hardware. Atomicity between the reads and writes is enforced via an arbitration mechanism in the PCIe device 750.

Also shown in FIG. 7, the PCIe device 750 includes data 762 and memory 764 in its memory 760, and one or more processors 768 in communication with the memory 760. Although the data 762 and instructions 764 are shown as residing in the same memory 760 as the PIV 782, it should be understood that a separate memory may be used.

Memory 760 stores information accessible by processor 768, including instructions 764 that may be executed by the processor 768. The memory also includes data 762 that may be retrieved, manipulated or stored by the processor. The memory may be of any type capable of storing information accessible by the processor, such as a hard-drive, memory card, ROM, RAM, DVD, CD-ROM, write-capable, and read-only memories. The memory 760 includes data 762 that may be retrieved, manipulated or stored by the processor in accordance with the instructions 764. For instance, although the system and method is not limited by any particular data structure, the data may be stored in computer registers, in a relational database as a table having a plurality of different fields and records, or XML documents. The data may also be formatted in any computer-readable format such as, but not limited to, binary values, ASCII or Unicode. Moreover, the data may comprise any information sufficient to identify the relevant information, such as numbers, descriptive text, proprietary codes, pointers, references to data stored in other memories (including other network locations) or information that is used by a function to calculate the relevant data.

The instructions 764 may be any set of instructions to be executed directly (such as machine code) or indirectly (such as scripts) by the processor. In that regard, the terms "instructions," "steps" and "programs" may be used interchangeably herein. The instructions may be stored in object code format for direct processing by the processor, or in any other computer language including scripts or collections of independent source code modules that are interpreted on demand or compiled in advance.

The instructions 764 may be executed by the processor, for example, to atomically set a bit "b" in a PIV and to send a notification to the CPU. For example, the instructions 764 may be executed by the processor 768 to atomically set a bit in the PIV according to any of the examples discussed above. In some examples, such as where the PIV 782 is maintained in the memory 760, the instructions 764 may provide for enforcing atomic behavior for accessing the CPU core.

The processor 768 may be a state machine or any conventional processor, such as processors from Intel Corporation or Advanced Micro Devices. Alternatively, the processor 768 may be a dedicated device such as an ASIC. Although FIG. 7 functionally illustrates the processor 768 and memory 760 as being within the same block, it will be understood that the processor and memory may actually comprise multiple processors and memories that may or may not be stored within the same physical housing. For example, some of the instructions and data may be stored on removable CD-ROM and others within a read-only computer chip. Some or all of the instructions and data may be stored in a location physically remote from, yet still accessible by, the processor 768. Similarly, the processor 768 may actually comprise a collection of processors which may or may not operate in parallel.

Once the PCIe device atomically sets the bit "b" in the PIV, as described in the various examples above, the PCIe device sends an interrupt to the target CPU notifying it of the change. For example, the PCIe device may encode the target CPU and a particular vector that was modified in an address and data of the PCIe write, and can send the interrupt to the particular vector of the target CPU.

Figure 8:
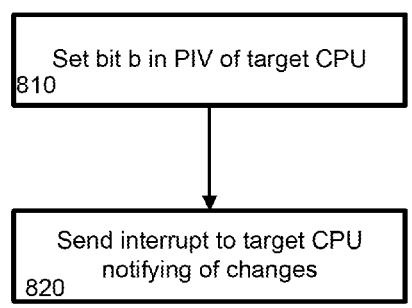
FIG. 8 is a flow diagram of an example method according to aspects of the disclosure.

FIG. 8 provides an example flow diagram illustrating a method 800 for generating interrupts compatible with limited interrupt virtualization hardware. The method 800 may be performed by, for example, a PCIe device, such as a modified NIC or SSD. It should be understood that the operations involved in the below method need not be performed in the precise order described. Rather, various operations may be handled in a different order or simultaneously, and operations may be added or omitted.

In block 810, the PCIe device atomically sets a bit b in a PIV of a target CPU. The bit may be set using interrupts compatible with a VT-d. For example, the PCIe device may use a compare-and-swap instruction, a fetch-and-add instruction, byte-enables, or a helper CPU core. According to another example, the PCIe device may perform a PCIe swap to the PIV, or store the PIV in its own memory.

In block 820, the PCIe device sends an interrupt to the target CPU notifying it of the changes to the PIV. For example, hypervisor software chooses the notification vector N, and writes N into virtual machine control structure so the CPU knows which interrupt is the notification vector. The PCIe device is also told which vector N to use.

The foregoing techniques are advantageous in that they enable PCIe devices to properly set PIV bits using interrupts compatible with limited interrupt virtualization hardware, such as a VT-d. Some examples provide this capability with significant speed. Moreover, some examples provide this capability with little or no hardware changes.

As these and other variations and combinations of the features discussed above can be utilized without departing from the subject matter as defined by the claims, the foregoing description of exemplary aspects should be taken by way of illustration rather than by way of limitation of the subject matter as defined by the claims. It will also be understood that the provision of the examples described herein (as well as clauses phrased as "such as," "e.g.", "including" and the like) should not be interpreted as limiting the claimed subject matter to the specific examples; rather, the examples are intended to illustrate only some of many possible aspects.

The invention claimed is:

1. A method for generating interrupts in a computer system using limited interrupt virtualization hardware, comprising:
   atomically setting, using a peripheral component interconnect express (PCIe) device, one or more bits in a posted interrupt vector (PIV) of a target central processing unit (CPU), wherein atomically setting the one or more bits comprises at least one of:
   executing a fetch-and-add instruction to increment a DWORD corresponding to the one or more bits in the PIV by a value of $2^{(b\ modulo\ 32)}$, where b is a bit in the PIV,
   using PCIe byte enables to write to a single byte in a PCIe address space that contains the one or more bits without modifying neighboring bytes in the PCIe address space, or
   performing a PCIe swap to the PIV by writing a bitvector setting a single vector, and
   sending, by the PCIe device, an interrupt to the target CPU, the interrupt notifying the target CPU of changes to the PIV.

2. The method of claim 1, wherein the limited hardware includes Virtualization Technology for Directed I/O (VT-d).

3. The method of claim 1, wherein atomically setting the one or more bits comprises executing a compare-and-swap function, comprising:
   comparing at least a given portion of the PIV to a value of 0;
   determining whether the given portion of the PIV is equal to 0; and
   writing to the one or more bits in the given portion of the PIV if the PIV is equal to 0.

4. The method of claim 1, wherein executing the fetch-and-add instruction comprises incrementing a DWORD corresponding to the one or more bits in the PIV by a value of $2^{(b\ modulo\ 32)}$, and further comprising:
   determining whether the one or more bits in the PIV have been cleared; and
   sending a subsequent interrupt if the one or more bits have been cleared; and
   if the one or more bits in the PIV have not been cleared, waiting to send the subsequent interrupt until the one or more bits have been cleared.

5. The method of claim 1, wherein using PCIe byte enables to write to a single byte in the PCIe address space that contains the one or more bits further comprises instructing a guest operating system in the target CPU not to assign any interrupts to a same range of vectors that includes the single byte.

6. The method of claim 1, further comprising using a helper CPU, wherein the helper CPU performs at least one of aggregating passthrough interrupts, sending atomic bit writes to the PIV, or sending interrupt notifications to the target CPU.

7. The method of claim 6, further comprising:
   polling, by the helper CPU, memory of the target CPU; and
   sending, using the PCIe device, message signaled interrupts to the polled memory.

8. The method of claim 1, wherein performing the PCIe swap further comprises:
   determining whether a returned swap value is 0; and
   if the returned swap value is not zero, providing the returned swap value to the target CPU.

9. A peripheral component interconnect express (PCIe) device for generating interrupts in a computer system using limited interrupt virtualization hardware, comprising:
   a memory storing instructions;
   a processor in communication with the memory, the processor executing the instructions to:
   atomically set one or more bits in a posted interrupt vector (PIV) of a target central processing unit (CPU), wherein atomically setting the one or more bits comprises at least one of:
      executing a fetch-and-add instruction to increment a DWORD corresponding to the one or more bits in the PIV by a value of $2^{(b\ modulo\ 32)}$, where b is a bit in the PIV,
      using PCIe byte enables to write to a single byte in a PCIe address space that contains the one or more bits without modifying neighboring bytes in the PCIe address space, or
      performing a PCIe swap to the PIV by writing a bitvector setting a single vector, and
   send an interrupt to the target CPU, the interrupt notifying the target CPU of changes to the PIV.

10. The device of claim 9, wherein the limited hardware includes Virtualization Technology for Directed I/O (VT-d).

11. The device of claim 9, wherein atomically setting the one or more bits comprises executing a compare-and-swap function, comprising:
   comparing the at least a given portion of the PIV to a value of 0;
   determining whether the given portion of the PIV is equal to 0; and
   writing to the one or more bits in the given portion of the PIV if the PIV is equal to 0.

12. The device of claim 9, wherein executing the fetch-and-add instruction further comprises:
   determining whether the one or more bits in the PIV have been cleared; and
   sending a subsequent interrupt if the one or more bits have been cleared; and
   if the one or more bits in the PIV have not been cleared, waiting to send the subsequent interrupt until the one or more bits have been cleared.

13. The device of claim 9, wherein using PCIe byte enables to write to a single byte in the PCIe address space that contains the one or more bits further comprises instructing a guest operating system in the target CPU not to assign any interrupts to a same range of vectors that includes the single byte.

14. The device of claim 9, further comprising using a helper CPU, wherein the helper CPU performs at least one of aggregating passthrough interrupts, sending atomic bit writes to the PIV, and sending interrupt notifications to the target CPU.

15. The device of claim 9, wherein performing the PCIe swap further comprises:
   determining whether a returned swap value is 0; and
   if the returned swap value is not zero, providing the returned swap value to the target CPU.

16. A non-transitory computer readable medium storing instructions executable by a processor to perform a method generating interrupts in a computer system using limited interrupt virtualization hardware, the method comprising:
   atomically setting one or more bits in a posted interrupt vector (PIV) of a target central processing unit (CPU), wherein atomically setting the one or more bits comprises at least one of:
      executing a fetch-and-add instruction to increment a DWORD corresponding to the one or more bits in the PIV by a value of $2^{(b\ modulo\ 32)}$, where b is a bit in the PIV,
      using peripheral component interconnect express (PCIe) byte enables to write to a single byte in a PCIe address space that contains the one or more bits without modifying neighboring bytes in the PCIe address space, or
      performing a PCIe swap to the PIV by writing a bitvector setting a single vector, and
   sending an interrupt to the target CPU, the interrupt notifying the target CPU of changes to the PIV.

17. A system, comprising:
   a peripheral component interconnect express (PCIe) device;
   at least one central processing unit (CPU) core, the at least one CPU core including a target CPU core; and
   a Virtualization Technology for Directed I/O (VT-d) coupled to the PCIe device through a PCIe switch and in communication with the at least one CPU core, the VT-d enabling communication between the PCIe device and the at least one CPU core,
   wherein the PCIe device is programmed to atomically set one or more bits in a posted interrupt vector (PIV) of the target CPU, and send an interrupt to the target CPU through the VT-d, the interrupt notifying a target CPU of changes to the PIV, and wherein atomically setting one or more bits in the PIV comprises at least one of:

executing a fetch-and-add instruction to increment a DWORD corresponding to the one or more bits in the PIV by a value of $2^{(b\ modulo\ 32)}$, where b is a bit in the PIV, using PCIe byte enables to write to a single byte in a PCIe address space that contains the one or more bits without modifying neighboring bytes in the PCIe address space, or performing a PCIe swap to the PIV by writing a bitvector setting a single vector.

18. The non-transitory computer readable medium of claim 16, wherein executing the fetch-and-add instruction further comprises:

determining whether the one or more bits in the PIV have been cleared; and sending a subsequent interrupt if the one or more bits have been cleared; and if the one or more bits in the PIV have not been cleared, waiting to send the subsequent interrupt until the one or more bits have been cleared.

19. The non-transitory computer readable medium of claim 16, wherein using PCIe byte enables to write to a single byte in the PCIe address space that contains the one or more bits further comprises instructing a guest operating system in the target CPU not to assign any interrupts to a same range of vectors that includes the single byte.

20. The system of claim 17, wherein executing the fetch-and-add instruction further comprises:

determining whether the one or more bits in the PIV have been cleared; and sending a subsequent interrupt if the one or more bits have been cleared; and if the one or more bits in the PIV have not been cleared, waiting to send the subsequent interrupt until the one or more bits have been cleared.

* * * * *